United States Patent [19]
Orikasa et al.

[11] Patent Number: 5,157,070
[45] Date of Patent: Oct. 20, 1992

[54] THERMOPLASTIC RESIN COMPOSITION AND METHOD FOR PREPARING THE SAME

[75] Inventors: Yuichi Orikasa, Yokohama; Suehiro Sakazume, Fujisawa, both of Japan

[73] Assignees: Nippon Petrochemicals Co., Ltd.; Nippon Oil & Fats Co., Ltd., both of Japan

[21] Appl. No.: 771,870

[22] Filed: Oct. 7, 1991

Related U.S. Application Data

[63] Continuation of Ser. No. 340,048, Apr. 18, 1989.

[30] Foreign Application Priority Data

Apr. 20, 1988 [JP] Japan .................. 63-97649
Apr. 21, 1988 [JP] Japan .................. 63-99067

[51] Int. Cl.$^5$ ............. C08L 67/00; C08L 77/00; C08L 81/04
[52] U.S. Cl. ............. 524/504; 525/64; 525/66; 525/68; 525/166; 525/189
[58] Field of Search ............. 525/64, 66, 68; 524/504

[56] References Cited

U.S. PATENT DOCUMENTS

| | | | |
|---|---|---|---|
| 4,804,707 | 2/1989 | Okamoto et al. | 525/66 |
| 4,861,828 | 8/1989 | Waggoner | 525/66 |
| 4,942,200 | 7/1990 | Flexman et al. | 525/133 |

FOREIGN PATENT DOCUMENTS

0304041 2/1989 Japan ................... 525/66

*Primary Examiner*—Ana L. Carrillo
*Attorney, Agent, or Firm*—Ostrolenk, Faber, Gerb & Soffen

[57] ABSTRACT

A novel thermoplastic resin composition is here disclosed which contains
(I) 99 to 1 part by weight of a polyarylate resin and
(II) 1 to 99 parts by weight of at least one selected from a polyamide resin and a polyarylene sulfide resin with
(III) 0.1 to 100 parts by weight, based on 100 parts by weight of the resins (I)+(II), of a multi-phase structure thermoplastic resin which is composed of 5 to 95% by weight of an epoxy group-containing olefin copolymer and 95 to 5% by weight of a vinyl polymer or copolymer obtained from at least one kind of vinyl monomer, either on both the components being in the state of a dispersion phase having a particle diameter of 0.001 to 10 μm.

Furthermore, a novel method for preparing the above-mentioned thermoplastic resin composition is also disclosed here.

13 Claims, 1 Drawing Sheet

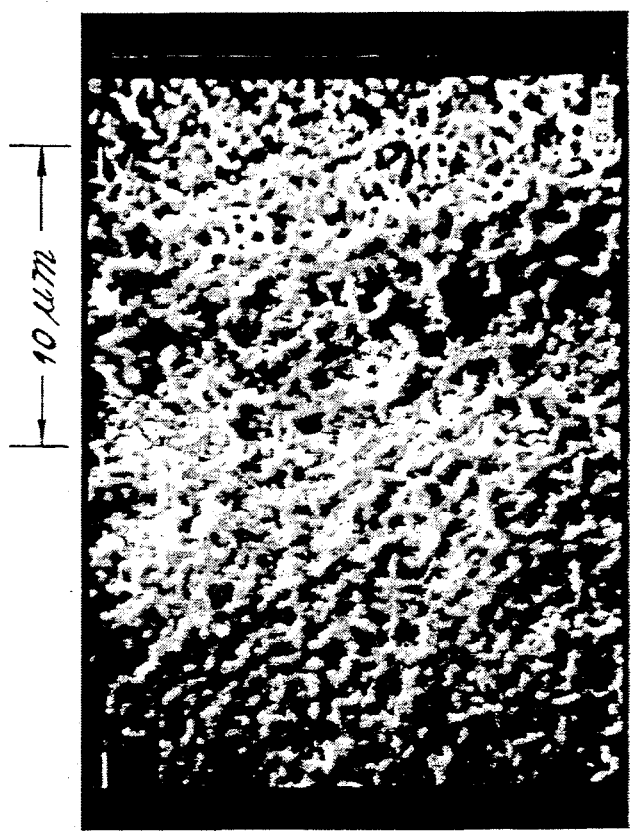

THERMOPLASTIC RESIN COMPOSITION AND METHOD FOR PREPARING THE SAME

This is a continuation of application Ser. No. 07/340,048 filed on Apr. 18, 1989, abandoned.

BACKGROUND OF THE INVENTION (1) Field of the Invention

The present invention relates to a thermoplastic resin composition having excellent impact resistance, electrical properties, heat resistance, moldability and dimensional stability, and a method for preparing the same. This composition of the present case can be widely utilized as materials for electrical and electronic parts, machine parts, automobile parts and the like.

(2) Description of the Prior Art

A polyarylate resin is an engineering plastic excellent in heat resistance, but it has the drawback that its impact resistance is poor.

In recent years, a composition comprising a plurality of engineering plastics has become known as a polymer alloy and, it has advantages of the respective constituent plastics.

For example, Japanese Patent Laid-open Publication No. 171759/1986, 277462/1987 and 283146/1987 disclose techniques of mixing a polyamide resin with a polyarylate resin. That is, these publications suggest that an epoxy group-containing ethylene copolymer and an acid anhydride-containing ethylene copolymer are used to improve the compatibility of the polyarylate resin with the polyamide resin, though these resins are different in chemical structure. These copolymers which are used for the improvement of the compatibility have good affinity for the polyamide resin, but their affinity for the polyarylate is insufficient, so that the improvement effect of physical properties is unsatisfactory.

On the other hand, it can be expected that the polyarylate resin can be mixed with a polyarylene sulfide so as to obtain a material having excellent flame retardance, heat resistance and mechanical properties, but the compatibility of the polyarylate resin with the polyarylene sulfide resin is poor. In consequenece, techniques of mixing these resins have not been present so far.

SUMMARY OF THE INVENTION

The inventors of the present application have intensely researched to solve the above-mentioned problems, and as a result, they have found that when a specific multi-phase structure thermoplastic resin obtained from an epoxy group-containing olefin copolymer is used, the compatibility of a polyarylate resin with a polyamide resin and/or a polyarylene sulfide resin is improved, so that a thermoplastic resin composition can be obtained which retains excellent mechanical properties, impact resistance, moldability, heat resistance and dimensional stability.

That is, the first aspect of the present invention is directed to a thermoplastic resin composition prepared by blending (I) 99 to 1 part by weight of a polyarylate resin and (II) 1 to 99 parts by weight of at least one selected from a polyamide resin and a polyarylene sulfide resin with (III) 0.1 to 100 parts by weight, based on 100 parts by weight of the aforesaid resins (I) +(II), of a multi-phase structure thermoplastic resin which is composed of 5 to 95% by weight of an epoxy group-containing olefin copolymer and 95 to 5% by weight of a vinyl polymer or copolymer obtained from at least one kind of vinyl monomer, either or both the components being in the state of a dispersion phase having a particle diameter of 0.001 to 10 μm.

The second aspect of the present invention is directed to a method for preparing a thermoplastic resin composition which comprises the step of melting and mixing a polyarylate resin (I) and at least one resin (II) selected from a polyamide resin and a polyarylene sulfide resin with 1 to 100% by weight of a graft polymerization precursor (A) which is obtained by first adding at least one kind of vinyl monomer, at least one kind of radical polymerizable or copolymerizable organic peroxide and a radical polymerization initiator to an aqueous suspension of an epoxy group-containing olefin copolymer, then heating the suspension under such conditions that the decomposition of the radical polymerization initiator does not occur substantially, in order to impregnate the epoxy group-containing olefin copolymer with the vinyl monomer, radical polymerizable or copolymerizable organic peroxide and radical polymerization initiator, and raising the temperature of this aqueous suspension, when the degree of the impregnation has reached 50% by weight or more of the original total weight of the vinyl monomer, peroxide and initiator, in order to copolymerize the vinyl monomer with the radical polymerizable or copolymerizable organic peroxide in the epoxy group-containing olefin copolymer, 0 to 99% by weight of an epoxy group-containing olefin copolymer (B), and 0 to 99% by weight of a vinyl polymer or copolymer (C) obtained by polymerizing at least one kind of vinyl monomer, or alternatively melting and mixing the components (A), (B) and (C) previously at a temperature in the range of 100 to 300° C. to form a multi-phase structure thermoplastic resin (III), and then melting and mixing the resin (III) with the resins (I) and (II).

BRIEF DESCRIPTION OF THE PHOTOGRAPH

The figure is an electron microscope photograph (10,000 magnifications) of a multi-phase structure thermoplastic resin prepared in Preparation Example 1 in which spherical styrene polymer particles having a diameter of 0.3 to 0.4 μm are dispersed in a matrix comprising ethylene-glycidyl methacrylate copolymer.

DETAILED DESCRIPTION OF THE INVENTION

A polyarylate resin used in the present invention is a polyester obtained from a bisphenol represented by the following formula and terephthalic acid and/or isophthalic acid:

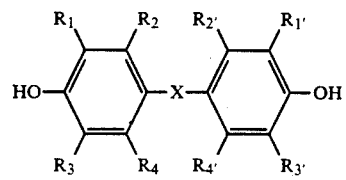

wherein X is —O—, —S—, —S$_2$—, —CO—or a hydrocarbon group having 1 to 10 carbon atoms; and each of $R_1$, $R_2$, $R_3$, $R_4$, $R_1'$, $R_2'$, $R_3'$ and $R_4'$ is a hydrogen atom, a halogen atom or a hydrocarbon group.

Examples of the hydrocarbon group having 1 to 10 carbon atoms include an alkylene group, alkyl group having a branched chain, or alkyl group substituted by a halogen. Preferable typical examples of the hydrocarbon group are methylene, ethylene, propylene, butylene, isopropylidene, cyclohexylmethylene and chloroethylene, and isopropylidene is particularly preferable. Furthermore, in the case that $R_1$, $R_2$, $R_3$, $R_4$, $R_1'$, $R_2'$, $R_3'$ or $R_4'$ is the hydrocarbon group, this hydrocarbon group is preferably an alkyl group, particularly preferably a lower alkyl group.

Typical examples of the above-mentioned bisphenol include 4,4'-dihydroxydiphenyl ether, 4,4'-dihydroxy-2,2'-dimethyldiphenyl ether, 4,4'-dihydroxy-3,3'-dicyclorodiphenyl ether, 4,4'-dihydroxydiphenyl sulfide, 4,4'-dihydroxy-diphenyl sulfone, 4,4'-dihyroxydiphenyl ketone, 4,4'-dihyroxy-diphenylmethane, 1,2-bis(4'-hydroxyphenyl)ethane, 2,2-bis-(4'-hydroxyphenyl)propane, 1,4-bis(4'-hydroxyphenyl)n-butane, bis(4'-hydroxyphenyl)cyclohexylmethane and 1,2-bis(4'-hydroxyphenyl)-1,1,2-trichloroethane. Above all, 2,2-bis(4'-hydroxyphenyl)propane, i.e., bisphenol A and 4,4'-dihydroxydiphenyl sulfone, i.e., bisphenol S are most preferable.

On the other hand, terephthalic acid and isophthalic acid may be used singly or in combination.

The above-mentioned polyarylate resin can be prepared by the polymerization reaction of the bisphenol with terephthalic acid and/or isophthalic acid, and this polymerization may be performed by an optional technique such as interfacial polymerization, solution polymerization or melting polymerization.

Preferably, the polyarylate resin has a molecular weight of about 5,000 to 70,000.

Examples of a polyamide resin used in the present invention include aliphatic polyamide resins such as 6-nylon, 6,6-nylon, 6,10-nylon, 6,12-nylon, 11-nylon, 12-nylon and 4,6-nylon; aromatic polyamide resins such as polyhexamethylenediamine terephthalamide, polyhexamethylene-diamine isophthalamide and xylene group-containing polyamide; modified compounds of these polyamides; and mixtures thereof. The particularly preferable polyamides are 6-nylon and 6,6-nylon.

The polyarylene sulfide resin used in the present invention is a polymer represented by the general formula

wherein Ar is a divalent aromatic residue containing at least one carbon six-membered ring such as

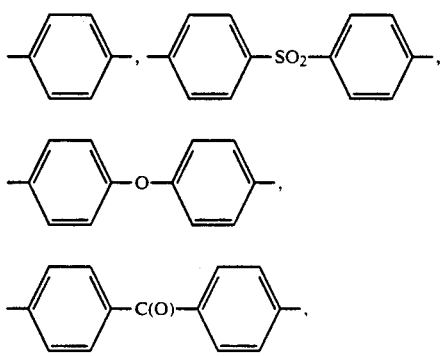

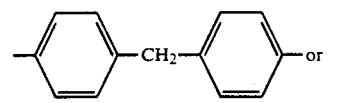

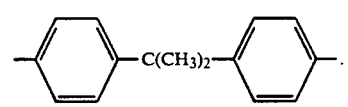

Furthermore, the above-mentioned aromatic ring may have a substituent such as F, Cl, Br or CH. The particularly typical one is a polyarylene sulfide (hereinafter referred to as PPS) represented by the general formula

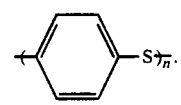

A method for preparing PPS is disclosed in Japanese Patent Publication No. 3368/1979. That is, PPS may be prepared by reacting paradichlorobenzene with sodium sulfide at a temperature of 160° to 250° C. under pressure in an N-methylpiloridone solution.

The epoxy group-containing olefin copolymer used in the present invention is a copolymer of an olefin and an unsaturated glycidyl group-containing monomer by a high-pressure radical polymerization as one example, or a terpolymer of an olefin, an unsaturated glycidyl group-containing monomer and another unsaturated monomer, or a multicomponent copolymer. The particularly preferable olefin of the copolymer is ethylene, and the preferable copolymer comprises 60 to 99.5% by weight of ethylene, 0.5 to 40% by weight of the glycidyl group-containing monomer and 0 to 39.5% by weight of another unsaturated monomer.

Examples of the unsaturated glycidyl group-containing monomer include glycidyl acrylate, glycidyl methacrylate, itaconic acid monoglycidyl ester, butenetricarboxylic acid monoglycidyl ester, butenetricarboxylic acid diglycidyl ester, butenetricarboxylic acid triglycidyl ester, vinyl glycidyl ethers and glycidyl esters of α-chloroaryl, maleic acid, crotonic acid and fumaric acid, allyl glycidyl ether, glycidyl oxyethylvinyl ether, glycidyl ethers such as styrene p-glycidyl ether, and p-glycidyl styrene. The particularly preferable ones are glycidyl methacrylate and allyl glycidyl ether.

Other examples of the unsaturated monomers include olefins, vinyl esters, α,β-ethylenic unsaturated carboxylic acids and their derivatives. Typical examples of such unsaturated monomers include olefins such as propylene, butene-1, hexene-1, decene-1, octene-1 and styrene, vinyl esters such as vinyl acetate, vinyl propionate and vinyl benzoate, acrylic acid, methacrylic acid, esters such as methyl, ethyl, propyl, butyl, 2-ethylhexyl, cyclohexyl, dodecyl and octadecyl acrylates and methacrylates, maleic acid, maleic anhydride, itaconic acid, fumaric acid, maleic monoesters and diesters, vinyl ethers such as vinyl chloride, vinyl methyl ether and vinyl ethyl ether, and acrylic amide compounds. Particularly, acrylic and methacrylic esters are preferable.

Typical examples of the epoxy group-containing olefin copolymer include ethylene-glycidyl methacrylate copolymer; ethylene-vinyl acetate-glycidyl methacrylate copolymer; ethylene-ethyl acrylate-glycidyl methacrylate copolymer; ethylene-carbon monoxide-glycidyl methacrylate copolymer; ethylene-glycidyl acrylate copolymer; and ethylene-vinyl acetate-glycidyl acrylate copolymer. Above all, ethylene-glycidyl methacrylate copolymer, ethylene-ethyl acrylate-glycidyl methacrylate copolymer and ethylene-vinyl acetate-glycidyl methacrylate copolymer are preferred.

These epoxy group-containing olefin copolymers can be used in the form of a mixture thereof.

The epoxy group-containing olefin copolymer may be prepared by a high-pressure radical polymerization, i.e., by simultaneously or stepwise contacting and polymerizing a monomer mixture of 60 to 99.5% by weight of the above-mentioned ethylene, 0.5 to 40% by weight of one or more unsaturated glycidyl group-containing monomer, and 0 to 39.5% by weight of at least one other unsaturated monomer in the presence of 0.0001 to 1% by weight of a radical polymerization initiator based on the total weight of all the monomers at a polymerization pressure of 500 to 4,000 kg/cm$^2$, preferably 1,000 to 3,500 kg/cm$^2$, at a reaction temperature of 50° to 400° C., preferably 100° to 350° C., using a chain transfer agent and, if necessary, some auxiliaries in an autoclave or tubular reactor.

Examples of the above-mentioned radical polymerization initiator include usual initiators such as peroxides, hydroperoxides, azo-compounds, amine oxide compounds and oxygen.

Examples of the chain transfer agent include hydrogen, propylene, butene-1, saturated aliphatic hydrocarbons having 1 to 20 carbon atoms such as methane, ethane, propane, butane, isobutane, n-hexane, n-heptane and cycloparaffins; halogen-substituted hydrocarbons such as chloroform and carbon tetrachloride; saturated aliphatic alcohols having 1 to 20 or more carbon atoms such as methanol, ethanol, propanol and isopropanol; saturated aliphatic carbonyl compounds having 1 to 20 or more carbon atoms such as carbon dioxide, acetone and methyl ethyl ketone; and aromatic compounds such as toluene, diethylbenzene and xylene.

Another example of the epoxy group-containing olefin copolymer regarding the present invention is a modified compound prepared by adding the above-mentioned unsaturated glycidyl group-containing monomer to a conventional olefin homopolymer or copolymer.

Examples of the above-mentioned olefin homopolymer include low-density, medium-density and high-density polyethylenes, polypropylene, polybutene-1 and poly-4-methylpentene-1, and examples of the above-mentioned copolymers include ethylene-propylene copolymer; ethylene-butene-1 copolymer; ethylene-hexene-1 copolymer; ethylene-4-methylpentene-1 copolymer; copolymers with other α-olefins mainly comprising ethylene such as ethylene-octene-1 copolymer; copolymers with other α-olefins mainly comprising propylene such as propylene-ethylene block copolymer; ethylene-vinyl acetate copolymer; ethylene-acrylic acid copolymer; ethylene-methacrylic acid copolymer; copolymers of ethylene and methyl, ethyl, propyl, isopropyl and butyl acrylate and methacrylate; ethylene-maleic acid copolymer; ethylene-propylene copolymer rubber; ethylene-propylenediene-copolymer rubber; liquid polybutadiene; ethylene-vinyl acetate-vinyl chloride copolymer; and mixtures thereof.

Typical examples of the vinyl polymer and copolymer in the multi-phase structure thermoplastic resin (III) used in the present invention include polymers and copolymers prepared by polymerizing one or more of vinyl monomers such as vinyl aromatic monomers, for example, styrene, nucleus-substituted styrenes such as methylstyrene, dimethylstyrene, ethylstyrene, isopropylstyrene and chlorostyrene, and α-substituted styrene such as o-methylstyrene and α-ethyl-styrene; acrylate and methacrylate monomers, for example, alkyl esters having 1 to 7 carbon atoms of acrylic acid or methacrylic acid such as methyl, ethyl, propyl, isopropyl and butyl acrylate and methacrylate; acrylonitrile and methacrylonitrile monomers; vinyl ester monomers such as vinyl acetate and vinyl propionate; acrylamide and methacrylamide monomers; and monoesters and diesters of maleic anhydride and maleic acid. Above all, the vinyl polymer and copolymer containing 50% by weight or more of a vinyl aromatic monomer are particularly preferable.

The multi-phase structure thermoplastic resin (III) used in the present invention is an epoxy group-containing olefin copolymer or a vinyl polymer or copolymer matrix in which another vinyl polymer or copolymer or epoxy group-containing olefin copolymer is uniformly dispersed in a spherical form.

The polymer dispersed in the multi-phase structure thermoplastic resin has a particle diameter of 0.001 to 10 μm, preferably 0.01 to 5 μm. When the particle diameter of the dispersed polymer is less than 0.001 μm or is more than 10 μm, dispersion properties of the multi-phase structure thermoplastic resin in the polyamide resin and polyarylate resin are bad, and for example, poor appearance and impact resistance are not improved.

The vinyl polymer or copolymer in the multi-phase thermoplastic resin (III) regarding the present invention has a number average polymerization degree of 5 to 10,000, preferably 10 to 5,000.

When the number average polymerization degree is less than 5, impact resistance of the thermoplastic resin composition regarding the present invention can be improved, but heat resistance deteriorates unpreferably. Inversely, when it is in excess of 10,000, melting viscosity is high, moldability deteriorates, and surface gloss falls off unpreferably.

The multi-phase thermoplastic resin (III) used in the present invention comprises 5 to 95% by weight, preferably 20 to 90% by weight, of the epoxy group-containing olefin copolymer and 95 to 5% by weight, preferably 80 to 10% by weight, of the vinyl polymer or copolymer.

When the epoxy group-containing olefin copolymer is less than 5% by weight, its compatible effect with the polyamide resin is not exerted sufficiently, and when it is more than 95% by weight, heat resistance and dimensional stability of the blend regarding the present invention are impaired.

As a grafting technique used to prepare the multi-phase structure thermoplastic resin (III) regarding the present invention, there may be employed a well known process such as a chain transfer process and an ionizing radiation process, but the following process is most preferable, because grafting efficiency is high, secondary cohesion due to heat does not occur, and therefore performance can be exerted effectively.

Now, a method for preparing the thermoplastic resin composition of the present invention will be described in detail.

That is, water is suspended in 100 parts by weight of an epoxy group-containing olefin copolymer. Afterward, 5 to 400 parts by weight of at least one vinyl monomer is added to the suspension, and in the mixture, a solution is poured in which there are dissolved 0.1 to 10 parts by weight, based on 100 parts by weight of the vinyl monomer, of one or a mixture of radical polymerizable or copolymerizable organic peroxides represented by the undermentioned general formula (a) or (b) and 0.01 to 5 parts by weight, based on 100 parts by weight of the total of the vinyl monomer and the radical polymerizable or copolymerizable organic peroxide, of a radical polymerization initiator in which a decomposition temperature to obtain a half-life period of 10 hours is from 40° to 90° C. The mixture is then heated under conditions that the decomposition of the radical polymerization initiator does not occur substantially, in order to impregnate the epoxy group-containing olefin copolymer with the vinyl monomer, the radical polymerizable or copolymerizable organic peroxide and the radical polymerization initiator. When the impregnation ratio has reached 50% by weight or more of the original total weight of the monomer, peroxide and initiator, the temperature of this aqueous suspension is raised to copolymerize the vinyl monomer with the radical polymerizable or copolymerizable organic peroxide in the epoxy group-containing olefin copolymer, thereby obtaining a graft polymerization precursor (A). This graft polymerization precursor (A) is further kneaded under melting at a temperature of 100° to 300° C. in order to prepare the desired multi-phase structure thermoplastic resin (III) of the present invention. At this time, the graft polymerization precursor may be kneaded under melting with the epoxy group-containing olefin copolymer (B) or vinyl polymer or copolymer (C) so as to obtain the multi-phase structure thermoplastic resin (III).

The graft polymerization precursor (A) is also the multi-phase structure thermoplastic resin. Therefore, this graft polymerization precursor may be directly mixed under melting with the polyarylate resin and at least one selected from the polyamide resin and polyarylene sulfide.

The above-mentioned radical polymerizable or copolymerizable organic peroxides are compounds represented by the general formulae (a) and (b):

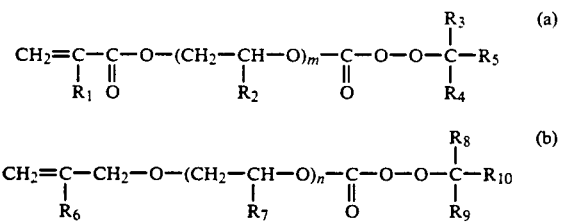

wherein $R_1$ is a hydrogen atom or an alkyl group having 1 or 2 carbon atoms, each of $R_2$ and $R_7$ is a hydrogen atom or a methyl group, $R_6$ is a hydrogen atom or an alkyl group having 1 to 4 carbon atoms, each of $R_3$, $R_4$, $R_8$ and $R_9$ is an alkyl group having 1 to 4 carbon atoms, each of $R_5$ and $R_{10}$ is an alkyl group having 1 to 12 carbon atoms, a phenyl group, an alkyl-substituted phenyl group or a cycloalkyl group having 3 to 12 carbon atoms, m is 1 or 2, and n is 0, 1 or 2.

Typical examples of the radical polymerizable or copolymerizable organic peroxides represented by the general formula (a) include t-butylperoxyacryloyloxyethyl carbonate, t-amylperoxyacryloyloxyethyl carbonate, t-hexylperoxyacryl-oyloxyethyl carbonate, 1,1,3,3-tetramethylbutylperoxyacryl-oyloxyethyl carbonate, cumylperoxyacryloyloxyethyl carbonate, p-isopropylcumylperoxyacryloyloxyethyl carbonate, t-butylperoxymethacryloyloxyethyl carbonate, t-amylperoxy-methacryloyloxyethyl carbonate, 1,1,3,3-tetramethylbutyl-peroxymethacryloyloxyethyl carbonate, cumylperoxymethacryl-oyloxyethyl carbonate, p-isopropylcumylperoxymethacryloyl-oxyethyl carbonate, t-butylperoxyacryloyloxyethoxyethyl carbonate, t-amylperoxyacryloyloxyethoxyethyl carbonate, t-hexylperoxyacryloyloxyethoxyethyl carbonate, 1,1,3,3-tetramethylbutylperoxyacryloyloxyethoxyethyl carbonate, cumylperoxyacryloyloxyethoxyethyl carbonate, p-isopropyl-cumylperoxyacryloyloxyethoxyethyl carbonate, t-butylper-oxymethacryloyloxyethoxyethyl carbonate, t-amylperoxy-methacryloyloxyethoxyethyl carbonate, t-hexylperoxymeth-acryloyloxyethoxyethyl carbonate, 1,1,3,3-tetramethylbutyl-peroxymethacryloyloxyethoxyethyl carbonate, cumylperoxy-methacryloyloxyethoxyethyl carbonate, p-isopropylcumylp-er-oxymethacryloyloxyethoxyethyl carbonate, t-butyl-peroxy-acryloyloxyisopropyl carbonate, t-amylperoxyacryloyloxyiso-propyl carbonate, t-hexylperoxyacryloyloxyisopropyl carbonate, 1,1,3,3-tetramethyl-butylperoxyacryloyloxyiso-propyl carbonate, cumyl-peroxyacryloyloxyisopropyl carbonate, p-isopropyl-cumylperoxyacryloyloxyisopropyl carbonate, t-butyl-peroxymethacryloyloxyisopropyl carbonate, t-amyl-peroxymethacryloyloxyisopropyl carbonate, t-hexyl-peroxymethacryloyloxyisopropyl carbonate, 1,1,3,3-tetramethylbutyl-peroxymethacryloyloxyisopropyl carbonate, cumylperoxymethacryloyloxyisopropyl carbonate, and p-isopropylcumylperoxymethacryloyloxyisopropyl carbonate.

Typical examples of the compounds represented by the general formula (b) include t-butylperoxyallyl carbonate, t-amylperoxyallyl carbonate, t-hexylperoxyallyl carbonate, 1,1,3,3-tetramethylbutylperoxyallyl carbonate, p-menthane-peroxyallyl carbonate, cumylperoxyallyl carbonate, t-butyl-peroxymethallyl carbonate, t-amylperoxymethallyl carbonate, t-hexylperoxymethallyl carbonate, 1,1,3,3-tetramethylbutyl-peroxymethallyl carbonate, p menthaneperoxymethallyl carbonate, cumylperoxymethallyl carbonate, t-butylperoxyallylox-yethyl carbonate, t-amylperoxyallyloxyethyl carbonate, t-butylperoxymethallyloxyethyl carbonate, t-amyl-peroxymethallyloxyethyl carbonate, t-hexylperoxyme-thallyloxyethyl carbonate, t-butylperoxyallyloxyisopropyl carbonate, t-amylperoxyallyloxyisopropyl carbonate, t-hexylperoxyallyloxyisopropyl carbonate, t-butyl-peroxymethallyloxyisopropyl carbonate, and t-hexyl-methallyloxyisopropyl carbonate.

Of these compounds, preferable ones are t-butyl-peroxyacryloyloxyethyl carbonate, t-butylperoxyme-thacryloyloxyethyl carbonate, t-butylperoxyallyl carbonate and t-butylperoxymethallyl carbonate.

In the present invention, an inorganic filler (IV) can be used in an amount of 1 to 150 parts by weight based on 100 parts of the components (I) +(II) +(III).

The inorganic filler may be used in granular, lamellar, scaly, needle, spherical, hollow and fibrous forms, and examples of these inorganic fillers include granular fillers such as calcium sulfate, calcium silicate, clay, diatomaceous earth, talc, alumina, siliceous sand, glass powder, iron oxide, metallic powder, graphite, silicon carbide, silicon nitride, silica, boron nitride, aluminum nitride and carbon black; lamellar and scaly fillers such as mica, glass plate, sericite, pyrophyllite, metallic foil, for example, aluminum flake, and graphite; hollow fillers such as Shirasu balloon, metallic balloon, glass balloon and pumice; and mineral fibers such as glass fiber, carbon fiber, graphite fiber, whisker, metallic fiber, silicon carbide fiber, asbestos and wollastonite.

When the content of the filler is in excess of 150 parts by weight, the impact strength of molded articles deteriorates.

The surface of the inorganic filler is preferably treated by the use of stearic acid, oleic acid, palmitic acid or a metallic salt thereof, paraffin wax, polyethylene wax or a modified material thereof, an organic silane, an organic borane or an organic titanate.

In the preparation of the thermoplastic composition of the present invention, melting and mixing the above-mentioned components (I)+(II)+(III) are carried out at a temperature of 200° to 350° C., preferably 200° to 320° C.

In melting and mixing, there may be used a usual kneader such as a mixing roll, a Banbury's mixer, a kneader mixer, a kneading extruder, a twin screw extruder and rolls. With regard to the order of melting and mixing the respective components, all of the components may be simultaneously melted and mixed, or alternatively the polyarylate resin (I) or at least one resin (II) selected from the polyamide resin and polyarylene sulfide resin may be mixed under melting with the multi-phase thermoplastic resin (III), and afterward the resulting mixture may be then mixed under melting with the other resin.

In the present invention, the following materials can be additionally used, in so far as they do not deviate from the gist of the present invention. Examples of such materials include a polyolefin resin, polyvinyl chloride resin, polyvinylidene chloride resin, fluorine-contained resin, aromatic polyester resin, polyphenylene ether resin, polysulfone resin, natural rubber and synthetic rubber, inorganic flame retardant such as magnesium hydroxide or aluminum hydroxide, halogen or phosphorus series flame retardant, antioxidant, ultraviolet absorbent, lubricant, dispersant, foaming agent, cross-linking agent and colorant.

Now, the present invention will be described in detail in reference to examples.

Preparation Example 1 (Preparation of Multi-phase Structure Thermoplastic Resin III)

In a 5-liter stainless steel autoclave was placed 2,500 g of pure water, and 2.5 g of polyvinyl alcohol was dissolved therein as a suspending agent. To the solution was further added 700 g of ethylene-glycidyl methacrylate copolymer as an epoxy group-containing olefin copolymer (content of glycidyl methacrylate=15% by weight; trade name Rexpearl J-3700; made by Nippon Petrochemicals Co., Ltd.), followed by stirring and suspending in a nitrogen atmosphere. Separately, in 300 g of styrene as a vinyl monomer were dissolved 1.5 g of benzoylperoxide as a radical polymerization initiator (trade name Nyper-B; made by Nippon Oils & Fats Co., Ltd.) and 6 g of t-butylperoxymethacryloyloxyethyl carbonate as a radical polymerizable or copolymerizable organic peroxide, and the resulting solution was then placed in the above-mentioned autoclave, followed by stirring.

Afterward, the autoclave was heated up to a temperature of 60° to 65° C., and stirring was then continued for 2 hours, so that the epoxy group-containing olefin copolymer was impregnated with the vinyl monomer containing the radical polymerization initiator and the radical polymerizable or copolymerizable organic peroxide. After it had been confirmed that the total amount of the impregnated vinyl monomer, radical polymerizable or copolymerizable organic peroxide and radical polymerization initiator was 50% by weight or more of the original total weight thereof, the temperature of the mixture was raised up to a level of 80° to 85° C., and this temperature was then maintained for 7 hours to complete polymerization, followed by water washing and drying, thereby obtaining a graft polymerization precursor (A). A styrene polymer was extracted from this graft polymerization precursor with ethyl acetate, and according to measurement by the use of GPC, the number average polymerization degree of the styrene polymer was 900.

Next, this graft polymerization precursor was extruded at 220° C. by a single screw extruder (trade name Labo-Plasto-mill; mady by Toyo Seiki Seisaku-sho Ltd.) to perform the grafting reaction, whereby a multi-phase structure thermoplastic resin III was obtained.

This multi-phase structure thermoplastic resin was then observed by a scanning electron microscope (trade name JEOL JSM T300; made by JEOL, Ltd.), and it was found that the resin was a multi-phase structure thermoplastic resin in which spherical resin particles each having a diameter of 0.3 to 0.4 μm were uniformly dispersed, as shown in the photograph.

EXAMPLES 1 TO 6

The multi-phase structure thermoplastic resin (III) obtained in the preparation example was mixed under melting with 6,6-nylon (trade name Amilan CM3001-N; made by Toray Industries, Inc.) as a polyamide resin and a polyarylate (which had been obtained from bisphenol A, terephthalic acid and isophthalic acid; a molar ratio of terephthalic acid/isophthalic acid=50/50) having a reduced viscosity of 0.85 dl/g in ratios shown in Table 1. In this case, the melting and mixing were performed in the cylinder of a one-direction rotating twin screw extruder (Plastic Engineering Laboratory Co., Ltd.) having a screw diameter of 30 mm, the temperature of the cylinder being set to 280° C. The resulting resin mixture was then molded into granules, and they were dried at 150° C. for 3 hours. Afterward, specimens were prepared from these granules by injection molding.

Sizes of the specimens and test procedures were as follows:

| | |
|---|---|
| Specimens for notched izod impact strength | 13 × 65 × 6 mm (JIS K7110) |
| Specimens for heat distortion temperature | 13 × 130 × 6 mm (JIS K7207) |
| Specimens for flexural modulus | 10 × 130 × 4 mm (JIS K6758) |

State of Delamination

The state of delamination was ranked as follows by visually observing the state of the broken surface of each molded article.

◎: Delamination was not present at all.
: Delamination was slightly present

X: Delamination was perceptibly present.

TABLE 1

| Example | 1 | 2 | 3 | 4 | 5 | 6 |
|---|---|---|---|---|---|---|
| Polyarylate (pts. wt.) | 80 | 80 | 70 | 40 | 40 | 20 |
| Polyamide (pts. wt.) | 20 | 20 | 30 | 60 | 60 | 80 |
| Multi-Phase Structure Thermoplastic Resin III (pts. wt.) | 15 | 20 | 20 | 15 | 20 | 15 |
| Notched Izod Impact Strength (kg·cm/cm) | 78 | 81 | 71 | 58 | 65 | 50 |
| Heat Distortion Temperature (°C.) | 167 | 163 | 155 | 145 | 140 | 126 |
| Flexural Modulus ($\times 10^3$ kg/cm$^2$) | 24.5 | 23.5 | 23.0 | 22.6 | 22.1 | 20.5 |
| State of Delamination | ⊙ | ⊙ | ⊙ | ⊙ | ⊙ | ⊙ |

EXAMPLES 7 TO 12

In these examples, the multi-phase structure thermoplastic resin used in the above examples was replaced with the graft polymerization precursor obtained in the preparation example, and the results are set forth in Table 2. The effect of these examples was similar to that of the examples in which the multi-phase structure thermoplastic resin was used.

TABLE 2

| Example | 7 | 8 | 9 | 10 | 11 | 12 |
|---|---|---|---|---|---|---|
| Polyarylate (pts. wt.) | 80 | 80 | 60 | 40 | 20 | 20 |
| Polyamide (pts. wt.) | 20 | 20 | 40 | 60 | 80 | 80 |
| Graft Polymerization Precursor (A) (pts. wt.) | 15 | 20 | 15 | 15 | 15 | 20 |
| Notched Izod Impact Strength (kg·cm/cm) | 73 | 77 | 65 | 60 | 51 | 55 |
| Heat Distortion Temperature (°C.) | 165 | 160 | 148 | 140 | 128 | 122 |
| Flexural Modulus ($\times 10^3$ kg/cm$^2$) | 25.0 | 24.2 | 23.7 | 22.8 | 20.8 | 20.0 |
| State of Delamination | ⊙ | ⊙ | ⊙ | ⊙ | ⊙ | ⊙ |

EXAMPLES 13 TO 16

The same procedure as in the above examples was repeated with the exception that a glass fiber having an average length of 5.0 mm and a diameter of 10 μm was additionally blended. The results are set forth in Table 3.

TABLE 3

| Example | 13 | 14 | 15 | 16 |
|---|---|---|---|---|
| Polyarylate (pts. wt.) | 90 | 80 | 30 | 20 |
| Polyamide (pts. wt.) | 10 | 20 | 70 | 80 |
| Multi-Phase Structure Thermoplastic Resin III (pts. wt.) | 20 | 20 | 20 | 20 |
| Glass Fiber (pts. wt.) | 30 | 30 | 30 | 30 |
| Notched Izod Impact Strength (kg·cm/cm) | 58 | 53 | 50 | 48 |
| Heat Distortion Temperature (°C.) | 169 | 157 | 144 | 138 |
| Flexural Modulus ($\times 10^3$ kg/cm$^2$) | 61.3 | 55.0 | 53.3 | 52.2 |

COMPARATIVE EXAMPLES 1 to 4

In contrast to the above-mentioned examples, an acid anhydride-modified polyethylene and the same ethylene-glycidyl methacrylate copolymer as used in the preparation example were employed. The results are set forth in Table 4.

TABLE 4

| Comp. Example | 1 | 2 | 3 | 4 |
|---|---|---|---|---|
| Polyarylate (pts. wt.) | 80 | 70 | 40 | 20 |
| Polyamide (pts. wt.) | 20 | 30 | 60 | 80 |
| Modified Polyethylene (pts. wt.)* | 10 | 10 | 10 | 10 |
| Ethylene-Glycidyl Methacrylate Copolymer (pts. wt.) | 10 | 10 | 10 | 5 |
| Notched Izod Impact Strength (kg·cm/cm) | 76 | 73 | 66 | 52 |
| Heat Distortion Temperature (°C.) | 150 | 141 | 128 | 115 |

*The addition amount of maleic anhydride was 0.3% by weight.

EXAMPLES 17 TO 22

Polyarylene sulfite (which would be referred to as "PPS" in tables) (trade name Ryton R-4; made by Philips Petroleum Co., Ltd.) was mixed under melting with a polyacrylate (which had been prepared from bisphenol A, terephthalic acid and isophthalic acid; a molar ratio of terephthalic acid/isophthalic acid was 50/50) having a reduced viscosity of 0.85 dl/g and the multi-phase structure thermoplastic resin (III) obtained in the preparation example in ratios shown in Table 5. The melting and mixing were carried out in the same manner as in Example 1.

The preparation of specimens, the sizes of the specimens and the procedure of tests were the same as in Example 1.

TABLE 5

| Example | 17 | 18 | 19 | 20 | 21 | 22 |
|---|---|---|---|---|---|---|
| PPS (pts. wt.) | 80 | 80 | 70 | 40 | 40 | 20 |
| Polyarylate (pts. wt.) | 20 | 20 | 30 | 60 | 60 | 80 |

TABLE 5-continued

| Example | 17 | 18 | 19 | 20 | 21 | 22 |
|---|---|---|---|---|---|---|
| Multi-Phase Structure Thermoplastic Resin III (pts. wt.) | 15 | 20 | 20 | 15 | 20 | 15 |
| Notched Izod Impact Strength (kg · cm/cm) | 14 | 17 | 20 | 22 | 26 | 30 |
| Heat Distortion Temperature (°C.) | 190 | 175 | 166 | 155 | 150 | 156 |
| Flexural Modulus (×10³ kg/cm²) | 110 | 102 | 92.3 | 60.3 | 51.0 | 23.5 |
| State of Delamination | ⊙ | ⊙ | ⊙ | ⊙ | ⊙ | ⊙ |

EXAMPLES 23 TO 28

The multi-phase structure thermoplastic resin in the above examples was replaced with the graph polymerization precursor obtained in the preparation example. The results are set forth in Table 6. The effect of these examples was similar to that of the examples in which the multi-phase structure thermoplastic resin was used.

TABLE 6

| Example | 23 | 24 | 25 | 26 | 27 | 28 |
|---|---|---|---|---|---|---|
| PPS (pts. wt.) | 80 | 80 | 60 | 40 | 20 | 20 |
| Polyarylate (pts. wt.) | 20 | 20 | 40 | 60 | 80 | 80 |
| Graft Polymerization Precursor (A) (pts. wt.) | 15 | 20 | 15 | 15 | 15 | 20 |
| Notched Izod Impact Strength (kg · cm/cm) | 15 | 15 | 17 | 19 | 20 | 31 |
| Heat Distortion Temperature (°C.) | 182 | 170 | 166 | 150 | 150 | 142 |
| Flexural Modulus (×10³ kg/cm²) | 100 | 96.7 | 71.3 | 60.0 | 32.0 | 29.0 |
| State of Delamination | ⊙ | ⊙ | ⊙ | ⊙ | ⊙ | ⊙ |

EXAMPLES 29 TO 32

The same procedure as in the above examples was repeated with the exception that a glass fiber having an average length of 5.0 mm and a diameter of 10 μm was additionally blended. The results are set forth in Table 7.

TABLE 7

| Example | 29 | 30 | 31 | 32 |
|---|---|---|---|---|
| PPS (pts. wt.) | 90 | 80 | 30 | 20 |
| Polyarylate (pts. wt.) | 10 | 20 | 70 | 80 |
| Multi-Phase Structure Thermoplastic Resin III (pts. wt.) | 20 | 20 | 20 | 20 |
| Glass Fiber (pts. wt.) | 30 | 30 | 30 | 30 |
| Notched Izod Impact Strength (kg · cm/cm) | 11 | 13 | 21 | 28 |
| Heat Distortion Temperature (°C.) | 192 | 187 | 171 | 166 |
| Flexural Modulus (×10³ kg/cm²) | 140 | 132 | 87.3 | 68.5 |

COMPARATIVE EXAMPLES 5 TO 8

In contrast to the above-mentioned examples, the same acid anhydride-modified polyethylene and ethylene-glycidyl methacrylate copolymer as used in Comparative Example 1 were employed. The results are set forth in Table 8.

TABLE 8

| Comp. Example | 5 | 6 | 7 | 8 |
|---|---|---|---|---|
| PPS (pts. wt.) | 80 | 70 | 40 | 20 |
| Polyarylate (pts. wt.) | 20 | 30 | 60 | 80 |
| Modified Polyethylene (pts. wt.)* | 10 | 10 | 10 | 10 |
| Ethylene-Glycidyl Methacrylate Copolymer (pts. wt.) | 10 | 10 | 10 | 5 |
| Notched Izod Impact Strength (kg · cm/cm) | 8 | 10 | 13 | 17 |
| Heat Distortion Temperature (°C.) | 150 | 141 | 136 | 127 |

*The addition amount of maleic anhydride was 0.3% by weight.

The thermoplastic resin composition of the present invention has improved heat resistance, impact resistance, moldability and chemical resistance, and in addition, this composition can be easily manufactured only by mixing raw materials under melting.

What is claimed is:

1. A thermoplastic resin composition containing
(I) 99 to 1 part by weight of a polyarylate resin and
(II) 1 to 99 parts by weight of at least one resin selected from a polyamide resin and a polyarylene sulfide resin with
(III) 0.1 to 100 parts by weight, based on 100 parts by weight of said resins (I)+(II), of a multi-phase structure thermoplastic resin which is a graft copolymer composed of 5 to 95% by weight of an epoxy group-containing olefin copolymer composed of ethylene and glycidyl (meth)acrylate and 95 to 5% by weight of a vinyl polymer or copolymer obtained by polymerization of at least one kind of vinyl monomer selected from the group consisting of vinyl aromatic monomers, acrylonitrile and methacrylonitrile monomers, and vinyl ester monomers, at least one of said resin (III) components being in the state of a dispersion phase having a particle diameter of 0.001 to 10 μm.

2. A thermoplastic resin composition according to claim 1 wherein said vinyl polymer or copolymer in said multi-phase structure thermoplastic resin has a number average polymerization degree of 5 to 10,000.

3. A thermoplastic resin composition according to claim 1 wherein said multi-phase structure thermoplastic resin is a grafted compound prepared by melting and mixing a graft polymerization precursor obtained by copolymerizing at least one vinyl monomer with at least one of radical polymerizable or copolymerizable organic peroxides represented by the following formulae (a) and (b)

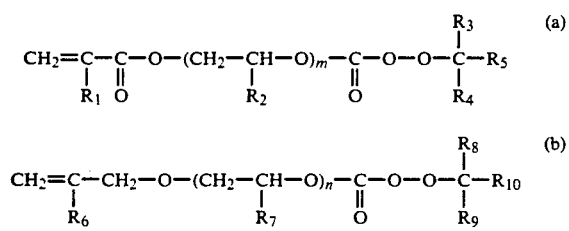

wherein $R_1$ is a hydrogen atom or an alkyl group having 1 or 2 carbon atoms, each of $R_2$ and $R_7$ is a hydrogen atom or a methyl group, $R_6$ is a hydrogen atom or an alkyl group having 1 to 4 carbon atoms, each of $R_3$, $R_4$, $R_8$ and $R_9$ is an alkyl group having 1 to 4 carbon atoms, each of $R_5$ and $R_{10}$ is an alkyl group having 1 to 12 carbon atoms, a phenyl group, an alkyl-substituted phenyl group or a cycloalkyl group having 3 to 12 carbon atoms, m is 1 or 2, and n is 0, 1 or 2, in particles of an epoxy group-containing olefin copolymer.

4. A thermoplastic resin composition according to claim 1 wherein said vinyl monomer is vinyl acetate.

5. A thermoplastic resin composition according to claim 1 wherein said vinyl polymer or copolymer is obtained by polymerization of vinyl aromatic monomer or mixture of monomers in which the content of vinyl aromatic monomer is 50% by weight or more.

6. A thermoplastic resin composition according to claim 1 wherein said epoxy group-containing olefin copolymer is composed of 60 to 99.5% by weight of ethylene, 40 to 0.5% by weight of glycidyl acrylate or glycidyl methacrylate and 0 to 39.5% by weight of another unsaturated monomer.

7. A thermoplastic resin composition according to claim 1 wherein an inorganic filler (IV) is additionally blended in an amount of 1 to 150 parts by weight based on 100 parts by weight of said thermoplastic resin composition (I)+(II)+(III).

8. A thermoplastic resin composition according to claim 1 wherein said polyarylate resin is the reaction product of bisphenol A or bisphenol S, and a phthalic acid and has a molecular weight of 5,000 to 70,000.

9. A thermoplastic resin composition according to claim 8 wherein said polyamide resin is nylon 6 or nylon 6,6 and the polyarylene sulfide resin is the reaction product of paradichlorobenzene and sodium sulfide.

10. A thermoplastic resin composition according to claim 9 wherein said epoxy group-containing olefin copolymer is composed of 60 to 99.5% by weight of ethylene, 40 to 0.5% by weight of glycidyl (meth)acrylate and 0 to 39.5% by weight of another unsaturated monomer.

11. A thermoplastic resin composition according to claim 10 wherein said another unsaturated monomer is a different (meth) acrylate.

12. A thermoplastic resin composition according to claim 11 wherein said multi-structure thermoplastic resin contains 20 to 90% by weight of said epoxy group-containing olefin copolymer.

13. A thermoplastic resin composition according to claim 12 wherein the particle diameter is 0.01 to 5 microns.

* * * * *